No. 870,996. PATENTED NOV. 12, 1907.
W. ROSS.
ICE CREAM SCRAPER.
APPLICATION FILED MAY 17, 1906.
2 SHEETS—SHEET 1.
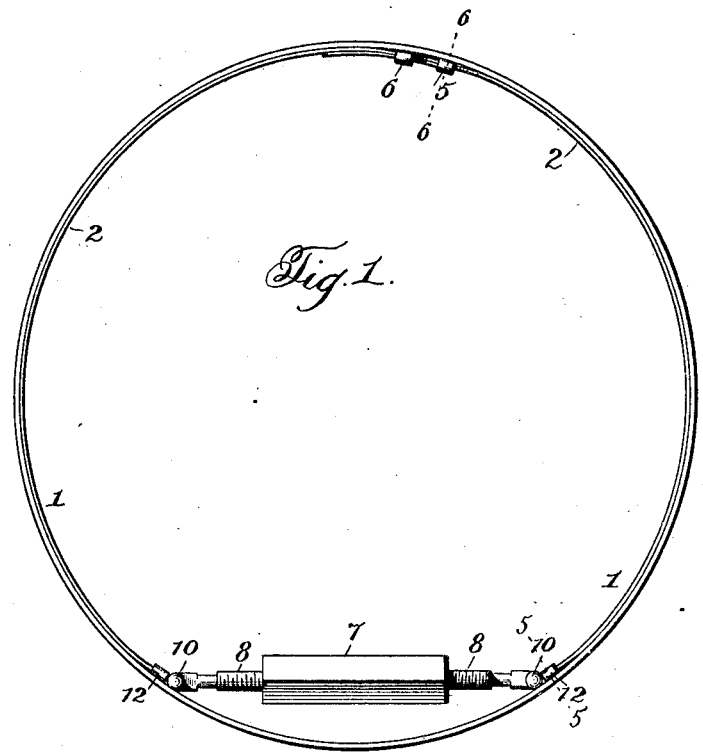
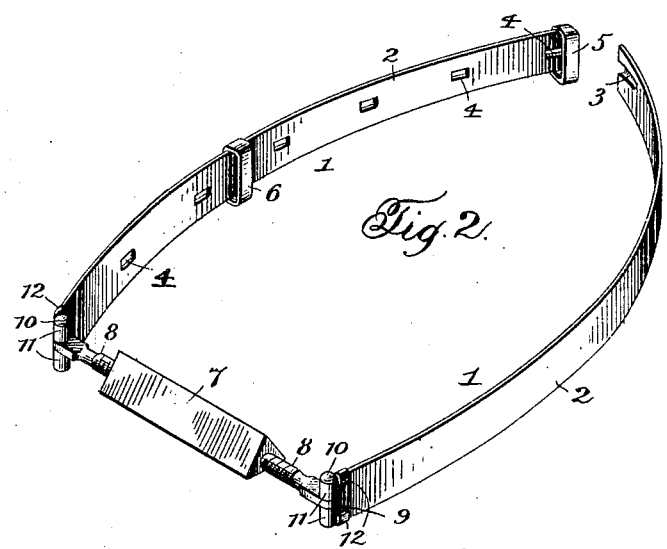
Witnesses:
Jas E Hutchinson
T. R. Titton
Inventor
William Ross
by [Attorney signature]
Attorney No. 870,996. PATENTED NOV. 12, 1907.
W. ROSS.
ICE CREAM SCRAPER.
APPLICATION FILED MAY 17, 1906.
2 SHEETS—SHEET 2.
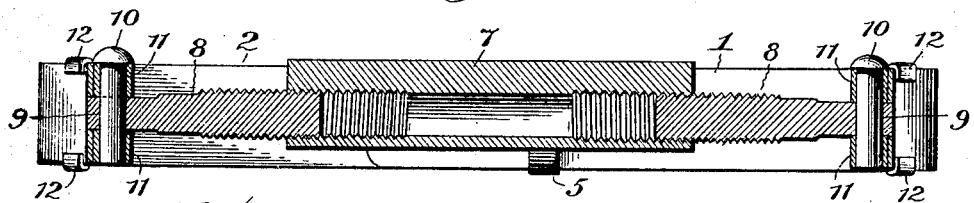
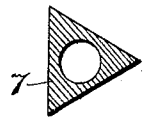  
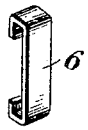
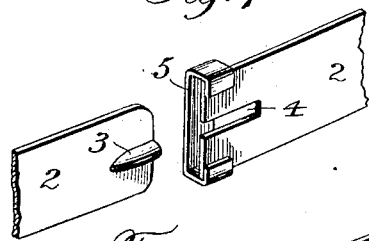
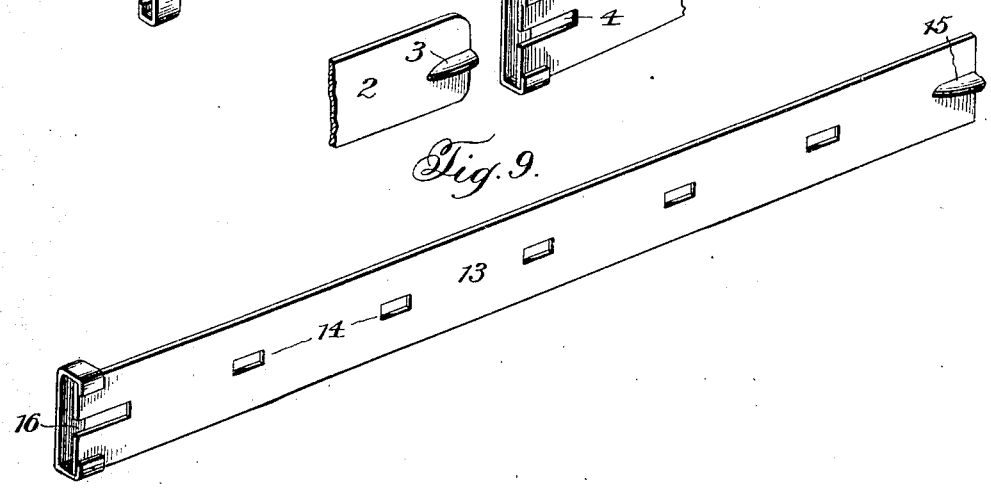
Witnesses:
Jas E Hutchinson
F. R. Fitton
Inventor:
William Ross
by
Attorney

UNITED STATES PATENT OFFICE.

WILLIAM ROSS, OF TROY, NEW YORK.

ICE-CREAM SCRAPER.

No. 870,996.  Specification of Letters Patent.  Patented Nov. 12, 1907.

Application filed May 17, 1906. Serial No. 317,413.

*To all whom it may concern:*

Be it known that I, WILLIAM ROSS, a citizen of the United States, residing at Troy, in the county of Rensselaer and State of New York, have invented certain new and useful Improvements in Ice-Cream Scrapers; and I do hereby declare the following to be a full, clear, and exact description of the invention, such as will enable others skilled in the art to which it appertains to make and use the same.
This invention relates to improvements in ice-cream scrapers.

In serving ice-cream from freezers through the medium of the spoons or dippers now commonly employed, it is extremely difficult to remove the surplus cream from the bowl of the spoon or dipper. The common expedient is to scrape the free edges of the bowl over the edge of the freezer, thus displacing the cream protruding beyond the edges of the bowl with a view to the same returning to the interior of the freezer. The cream, however, so displaced divides, and a large portion thereof passes down the exterior of the freezer, thereby becoming lost. Moreover, a further objection exists in that the loss of the cream, in melting, creates an uncleanly condition and renders the freezer unsightly. It is therefore the object of the present invention to provide a device by the use of which the surplus cream may be readily removed from the bowl of the spoon or dipper without loss, and also without displacing any of the cream from the interior of the bowl; one which may be placed and retained within the cream can, relatively to the surface of the cream, without affecting the closed position of the can cover, whereby the can may remain air-tight, and one which may be readily adjusted to varying sizes of cans without affecting in the least its usefulness, thus enabling a single scraper to be employed with different cans.

With these general objects in view, and others that will appear as the nature of the improvements is better understood, the invention consists substantially in the novel construction, combination and arrangement of parts hereinafter fully described, illustrated in the accompanying drawings, and pointed out in the appended claims.

While the form of the invention herein shown and described is believed to be a preferable embodiment thereof, it is obvious that the invention is not limited to this embodiment, but is susceptible of various changes in the form, proportion and minor details of construction, and the right is accordingly reserved to modify or vary the invention as falls within the spirit and scope thereof.

In the drawings—Figure 1 is a top plan view of the can of an ice-cream freezer having applied thereto a scraper constructed in accordance with the present invention. Fig. 2 is a perspective view of the scraper removed from the can. Fig. 3 is a longitudinal sectional view of the scraper taken through the adjusting elements thereof. Fig. 4 is a transverse sectional view of the scraper proper. Figs. 5 and 6 are similar views on the lines 5—5 and 6—6, respectively, Fig. 1. Fig. 7 is a detail perspective view of the meeting ends of the band sections, the ends being separated. Fig. 8 is a detail perspective view of the keeper. Fig. 9 is a similar view of a supplemental band section for use in adapting the invention to cans of larger sizes.

Referring in detail to the drawings, the numeral 1 designates a band, which band is formed of a plurality of sections 2, and it will be observed that the contiguous ends of said sections are overlapped and adjustable relatively to each other. To this end the extremity of one of the sections 2 is provided with a punched out portion forming a projecting lug 3, which lug is designed to enter any one of a series of longitudinal slots or openings 4 formed in the other section 2, when the sections are overlapped. This position of the projecting lug 3 in relation to the slots 4 limits sliding movement of the sections 2 upon each other, and in order to hold the sections in the lapped position a terminal loop 5 is rigidly connected to the section 2 provided with the slots 4, whereby separation of the sections at this point is prevented. It will be noted, however, that the terminal slot 4 in the section 2 which carries the loop 5, and which slot is immediately adjacent to said loop, extends to the extremity of said section, the purpose of this being to facilitate the passage of the projecting lug 3 when the section provided therewith is introduced through the loop 5. A keeper 6 is also mounted upon the section 2 having the slots 4, and slidable throughout the length thereof, said keeper being designed to be positioned over the end of the section 2 having the projecting lug 3, and thus maintain the extremity of said section upon the other section. The construction described provides effective means for holding the lapped ends of the sections in this relation, and consequently until pressure is applied to the sections the same will remain in the position to which adjusted.

The numeral 7 designates the scraper proper, said scraper being polygonal in cross section to provide a series of scraping edges, but preferably triangular, as illustrated in Fig. 4, and said scraper proper is provided with a longitudinal bore the ends of which are screw-threaded in opposite directions, to provide right and left-hand screw-threads, respectively. A screw-threaded shank 8 is arranged in each end of the scraper proper, the outer ends of said shanks having eyes 9 which receive pivotal pins 10, said pins being positioned in vertically-alined loops 11 formed at the extremities of the sections 2. These loops 11 are formed integral with the sections 2, and in order to strengthen the latter at the points where the loops 11 are formed reinforces

12 are fixedly connected to said sections, thus precluding breakage of the sections at the points contiguous to the loops 11.

To adapt the invention for use with cans of such diameters that a pair of the sections 2 is not sufficient, a supplemental section or sections may be interposed between the sections 2 to increase the length of the band, and in Fig. 9 one of these supplemental sections is illustrated. This section comprises an elongated strip 13 having a plurality of slots 14, similar to the slots 4, and in one end the strip 13 is punched out to provide a lug 15, similar to the lug 3. The other end of the strip 13 has fixedly connected thereto a terminal loop 16, corresponding to the loop 5, so that when the supplemental section is incorporated in the band the lug 15 will engage one of the slots 4 of the sections 2 provided therewith, while the terminal loop 16 will embrace the end of the other section 2. Obviously, as many of these supplemental sections as may be required can be incorporated in the band, and thus the latter will become adapted to different sizes of cans, irrespective of the diameter thereof. In this connection, it will be observed that the parts of the herein-described invention are formed of flexible metal, nickeled to give an ornamental appearance, and also to prevent damage or injury to the cream in the can, either by corrosion, or by otherwise producing unsanitary conditions.

In the use of the invention, the device is placed in the mouth of the cream can, and as the surface of the cream is lowered the scraper may be also lowered within the can. When so placed the band 1 frictionally engages the inner surface of the can, and by rotating the scraper proper 7 the band may be expanded to tightly engage the can. When this has been accomplished the scraper is held in a secure position, and as the spoon or dipper is filled with the cream in serving the latter, the edge of the bowl of the spoon or dipper is drawn over the edge of the scraper proper most remote from the inner side of the can. Thus the surplus cream which protrudes beyond the edges of the bowl of the spoon or dipper is effectually removed therefrom and caused to drop back into the can. There is, therefore, no portion of the surplus cream permitted to pass down the sides of the can, and consequently no portion of the cream is lost.

It may be stated that before introducing the device to the interior of the can the contiguous ends of the sections 2 are adjusted in relation to each other to vary the diameter of the band 1 to correspond approximately with the diameter of the can, and by rotating the scraper proper the sections 2 may be forced into close frictional engagement with the can, as above described.

The element 7 performs the dual function of a scraper and an adjuster for the sections 2, so that by rotating the scraper 7, as before described, the same not only effects a relative movement of the sections 2, but an edge thereof is also positioned for contact by the spoon or dipper for freeing the surplus cream therefrom.

By referring to Fig. 1, it will also be seen that while the sections 2 will conform strictly to the curvature of the walls of the can, a space remains between the scraper 7 and the contiguous portion of the can, so that the scraper 7 may be easily rotated in such space without liability of its edges contacting with the walls of the can. The scraper 7 may also be of any other form in cross section than triangular, but the latter is preferred since a sharper edge is formed thereby to serve for scraping purposes.

Having thus described the invention, what is claimed as new, and desired to be secured by Letters Patent, is:

1. A device of the class described, comprising a band, and a rotatable scraper proper adjustably connected to the ends of said band to expand and contract the band, said scraper being polygonal in cross-section to provide a series of scraping edges.

2. A device of the class described, comprising a series of band sections the contiguous ends of which are adapted to overlap, means for holding the lapped ends in such relation, and a scraper proper adjustably connected to the other ends of said sections to expand and contract the same.

3. A device of the class described, comprising a scraper proper, and means connected thereto for holding the same in applied position in a can, said holding means being adjustable to adapt the device to cans of varying sizes, the scraper proper being adjustably connected to the holding means to expand and contract the same, whereby the holding means are caused to frictionally engage the walls of the can to hold the device therein.

4. A device of the class described, comprising a band, a scraper proper associated therewith, and means for varying the diameter of said band to adapt the device to cans of varying sizes, said scraper being adjustably connected to the band to cause the latter to frictionally engage the walls of the can.

5. A device of the class described, comprising a band, and a scraper proper associated therewith, said scraper proper being adjustably connected to the band to expand and contract the same, whereby the band is caused to frictionally engage the walls of the can to hold the device therein.

6. A device of the class described, comprising a band formed of sections adjustable relatively to each other, and a scraper proper adjustably connected to the ends of said band and adapted to expand and contract the latter, whereby the sections of the band are caused to frictionally engage the walls of a can to hold the device therein.

7. A device of the class described, comprising a band formed of sections the contiguous ends of which are lapped and adjustable relatively to each other, and a scraper proper adjustably connected to the other ends of the sections of said band and adapted to expand and contract the latter, whereby the sections of the band are caused to frictionally engage the walls of the can to hold the device therein.

8. A device of the class described, comprising a band formed of sections the contiguous ends of which are lapped and adjustable relatively to each other, means for holding the contiguous ends of said sections in lapped relation, and a scraper proper adjustably connected to the other ends of the sections of said band and adapted to expand and contract the latter, whereby the sections of the band are caused to frictionally engage the walls of a can to hold the device therein.

9. A device of the class described, comprising a band, and a rotatable scraper proper adjustably connecting the ends thereof, said scraper proper acting to expand and contract said band to cause the latter to frictionally engage the walls of a can to hold the device therein.

10. A device of the class described, comprising a band, screw-threaded shanks connected to the ends thereof, and a scraper proper connected to said shanks and rotatable thereon, whereby the ends of said band are adjusted relatively to each other, said scraper proper being polygonal in cross-section to provide a series of scraping edges.

11. A device of the class described, comprising a band, screw-threaded shanks pivotally connected to the ends thereof, and a scraper proper connected to said shanks and rotatable thereon, whereby the ends of said band are adjusted relatively to each other.

12. A device of the class described, comprising a band formed of sections the contiguous ends of which are arranged in lapped relation, screw-threaded shanks pivotally connected to the other ends of said band, and a scraper proper connected to said shanks and rotatable thereon, whereby the ends of said band are adjusted relatively to each other.

13. A device of the class described, comprising a band, shanks pivotally connected to the ends thereof and screw-threaded in opposite directions, and a scraper proper having a bore the ends of which are screw-threaded in opposite directions and connected to said screw-threaded shanks, whereby by the rotation of said scraper proper the ends of said band are adjusted relatively to each other.

14. A device of the class described, comprising a band formed of sections the contiguous ends of which are lapped and adjustable relatively to each other, shanks pivotally connected to the ends of said band and screw-threaded in opposite directions, and a scraper proper having a bore the ends of which are screw-threaded in opposite directions and connected to said screw-threaded shanks, whereby by the rotation of said scraper proper the ends of said band are adjusted relatively to each other.

15. A device of the class described, comprising a band formed of sections the contiguous ends of which are lapped and adjustable relatively to each other, means for holding the contiguous ends of said sections in lapped relation, shanks connected to the ends of said band and screw-threaded in opposite directions, and a scraper proper having a bore the ends of which are screw-threaded in opposite directions and connected to said screw-threaded shanks, whereby by the rotation of said scraper proper the ends of said band are adjusted relatively to each other.

16. A device of the class described, comprising a band formed of sections the contiguous ends of which are lapped and adjustable relatively to each other, pivotal pins carried by the ends of said band, shanks pivotally connected to said pins and screw-threaded in opposite directions, and a scraper proper having a bore the ends of which are screw-threaded in opposite directions and connected to said screw-threaded shanks, whereby by the rotation of said scraper proper the ends of said band are adjusted relatively to each other.

In testimony whereof I affix my signature, in the presence of two witnesses.

WILLIAM ROSS.

Witnesses:
HENRY E. COOPER,
FANNIE R. FITTON.